United States Patent
Ognev et al.

(10) Patent No.: US 11,928,400 B2
(45) Date of Patent: Mar. 12, 2024

(54) INFORMATION MANAGEMENT IN MBSE MODELING TOOLS

(71) Applicant: The Boeing Company, Chicago, IL (US)

(72) Inventors: Ivan Ognev, Everett, WA (US); Karen Maria Herrera Teague, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/874,494

(22) Filed: May 14, 2020

(65) Prior Publication Data

US 2021/0357550 A1    Nov. 18, 2021

(51) Int. Cl.
G06F 111/02 (2020.01)
G06F 30/15 (2020.01)
G06F 30/20 (2020.01)

(52) U.S. Cl.
CPC .............. *G06F 30/20* (2020.01); *G06F 30/15* (2020.01); *G06F 2111/02* (2020.01)

(58) Field of Classification Search
CPC ....... G06F 30/20; G06F 30/15; G06F 2111/02
USPC .......................................................... 703/2
See application file for complete search history.

(56) References Cited

U.S. PATENT DOCUMENTS

| | | | |
|---|---|---|---|
| 8,751,424 B1* | 6/2014 | Wojcik | G06F 21/6218 706/20 |
| 9,275,198 B2* | 3/2016 | O'Gorman, Jr. | G06F 21/10 |
| 9,323,871 B2* | 4/2016 | Lininger | G06F 30/13 |
| 11,416,455 B2* | 8/2022 | Mendo Hernandez | G06F 16/116 |
| 2008/0126030 A1* | 5/2008 | Jain | G06Q 30/02 703/2 |

(Continued)

FOREIGN PATENT DOCUMENTS

EP    2587448    * 5/2013    ............ G06Q 90/00

OTHER PUBLICATIONS

Debreceni, Csaba. "Advanced techniques and tools for secure collaborative modeling." Ph.D. Dissertation, Budapest University of Technology and Economics. (2019). 164 pages (Year: 2019).*

(Continued)

*Primary Examiner* — Juan C Ochoa
(74) *Attorney, Agent, or Firm* — Jordan IP Law, LLC (57) ABSTRACT

A model-based engineering system (MBSE) tool includes functionality for sharing an MBSE model with multiple outside vendors using multiple versions of the MBSE model. A restricted version of the MBSE model is managed by a model maker (or other user with access rights) inside of an organization includes all of the model's engineering elements. The engineering elements are tagged with metadata that is analyzed to determine which elements are shareable and which are unshareable outside of the organization. An unrestricted version of the MBSE model is then created, either directly from the restricted version or through an intermediary version (referred to as the "stripped version"), to include only shareable engineering elements. This unrestricted version may then be shared with the outside vendors, and changes made by either in the restricted or unrestricted versions may be incorporated in the other versions, providing a truly collaborative MBSE experience.

20 Claims, 7 Drawing Sheets

(56) References Cited

U.S. PATENT DOCUMENTS

| | | | |
|---|---|---|---|
| 2014/0129182 A1* | 5/2014 | Weatherhead | G06F 30/00 703/1 |
| 2019/0095506 A1* | 3/2019 | Challagolla | G06F 16/252 |
| 2020/0026711 A1* | 1/2020 | Blom | G06F 16/9024 |
| 2020/0226220 A1* | 7/2020 | Eck | G06F 16/211 |
| 2021/0383297 A1* | 12/2021 | Ognev | G06Q 10/06313 |

OTHER PUBLICATIONS

Johnson, Jean, and Curtis Blais. Software hardware asset reuse enterprise (Share) repository framework final report: Component specification and ontology. Naval Postgraduate School Monterey CA Graduate School of Business and Public Policy, 2008, 170 pages (Year: 2008).*

Debreceni, Csaba, Gábor Bergmann, István Ráth, and Daniel Varró. "Secure views for collaborative modeling." IEEE Software 35, No. 6 (2018): 32-38 (Year: 2018).*

Do, Quoc, Stephen Cook, Peter Campbell, William Scott, Kevin Robinson, Wayne Power, and Despina Tramoundanis. "Requirements for a metamodel to facilitate knowledge sharing between project stakeholders." Procedia Computer Science 8 (2012): 285-292 (Year: 2012).*

Reid, Jack B., and Donna H. Rhodes. "Digital System Models: An investigation of the non-technical challenges and research needs." In Conference on Systems Engineering Research. 2016, 10 pages (Year: 2016).*

Bergmann, Gábor, Csaba Debreceni, István Ráth, and Dániel Varró. "Towards efficient evaluation of rule-based permissions for fine-grained access control in collaborative modeling." (2017): 135-144 (Year: 2017).*

Gómez, et al. "Scalable modeling technologies in the wild: an experience report on wind turbines control applications development." Software and Systems Modeling 19, No. 5 (2020): 1229-1261 (Year: 2020).*

* cited by examiner

INFORMATION MANAGEMENT IN MBSE MODELING TOOLS

BACKGROUND

Software for model-based systems engineering (MBSE) modeling is typically designed to have completely collaborative environments that may be shared with numerous groups, some of which may work for outside organizations. For example, a car manufacturer may have one group working on the engine of a particular car, another on the transmission, and another on the electronics. These three separate teams may share their respective designs with each other through an MBSE project file that is shared amongst the teams. Conventional MBSE software allows a user who has access to a project the ability to see anything within that project. While this works well when collaborators are within the same organization, issues arise when people from different organizations need to work together. In other words, conventional MBSE software does not allow for sensitive portions of an MBSE model to be hidden from an outside organization while other aspects of the MBSE model are shared.

Engineering systems frequently contain proprietary information that may not be shared outside of a company unless strict confidentiality (or "non-disclosure") agreements are in place. Even then, some information may be subject to export controls, such as International Traffic in Arms Regulations (ITAR), that restrict the transmission of information even further, or may include proprietary information that cannot be disclosed outside of the organization (e.g., trade secrets).

Traditionally, when an MBSE model cannot be shared outside of an organization, a completely separate environment is created outside of the MBSE application (e.g., in a spreadsheet) and only those individuals outside of the organization who have the required permissions can contribute to that environment. This severely limits modeling capabilities as these limited-access projects are typically part of a larger system consisting of projects that do not have the same restrictions in place. As a result, individuals with less access cannot contribute to more restrictive projects, or vice versa. There is currently no way of controlling what is shared, and thus, no sharing takes place.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed toward tools for creating multiple versions of an MBSE model for different users inside and outside of an organization to collaborate. A restricted version of the MBSE model is created by a model maker and includes all of a model's engineering elements. Metadata of these engineering elements are analyzed to determine which are shareable and which are unshareable outside of the organization. An unrestricted version of the MBSE model is generated to include only the engineering elements determined to be shareable outside of the organization. This unrestricted version may be generated directly from the restricted version of the model maker or from an intermediary version thereof. Outside vendors may then work in unrestricted versions of the MBSE model, and the model maker may work in the restricted version. Changes to engineering elements in either may be shared back and forth and incorporated in the different versions.

BRIEF DESCRIPTION OF THE DRAWINGS

The disclosed examples are described in detail below with reference to the accompanying drawing figures listed below.

DETAILED DESCRIPTION

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The examples disclosed herein generally refer to an MBSE modeling application that creates different versions of an MBSE model, allowing outside vendors to seamlessly integrate model changes while not having sensitive or proprietary information that may not be exposed outside of an organization. Two versions of an MBSE model are created: a restricted version and an unrestricted version. The restricted version includes all of the model data of the MBSE model, including shareable and unshareable data, as referenced below. The unrestricted version only includes shareable data, not unshareable data. The MBSE modeling applications disclosed herein analyze metadata tagged to—or associated with—the MBSE model data to determine which engineering elements of the MBSE model are shareable and which are unshareable. Then, the unrestricted version of the MBSE model is generated to include only the engineering elements of the MBSE model that are shareable, providing a version of the MBSE model that may be shared without outside vendors.

To clarify the terms used herein, the "restricted version" includes all of the engineering elements of an MBSE model (both shareable and unshareable engineering elements).

Whereas, the "unrestricted version" includes only shareable engineering elements. Thus, the restricted version includes more of the MBSE model than the unrestricted versions, even though it is referred to as a "restricted" version. This terminology references the fact that the restricted version may only be accessed by a restricted number of people who can view the unshareable engineering elements. On the other hand, the unrestricted version, which does not include unshareable engineering elements, may be accessed by a far wider group of people. In other words, access to the restricted version is limited to only a "restricted" subset of people—typically inside an organization—while the unrestricted version may be accessed by more people.

The unrestricted version, as used herein, may also be referred to as an "open" or "shareable version." The terms unrestricted version, open version, and shareable version are synonymous herein and may be interchanged to refer to the same version of the MSBE model that is void of any unshareable engineering elements.

To aid the reader, a running example is discussed throughout this disclosure, whereby a human user referred to as an "MBSE modeler" designs an MBSE model and collaborates with one or more "outside vendors." The MBSE modeler works for an organization, the "internal organization," that uses outside vendors from "external organizations" to design various aspects of the engineering system of the MBSE model. The restricted version of the MBSE model, having both shareable and unshareable model data, is built for use only by those inside the internal organization. The unrestricted version of the MBSE model, having only shareable model data, is created for the outside organizations.

The disclosed MBSE tools are configured to generate and manage MBSE models that include a collection of different engineering elements that make up MBSE model data. Term "MBSE model" refers to a digital model, document, database, diagram, procedure, or the like, which is created and managed in connection with a manufactured or produced product or service. The MBSE model is made up of various "engineering elements" that may include any of the following MBSE objects, as specified in the Systems Modeling Language ("SysML"): blocks; relationships; inputs/outputs; ports; operations; properties; constraints; features; diagrams; subsystems; interfaces; designs; flow properties; item flows; artifacts; or the like. For example, an MBSE model for a car may include an "engine" subsystem that includes various blocks for a transmission, fuel injector, battery, and other constituent parts of the engine. Additionally, the engineering elements referenced herein also include metadata (e.g., metadata tags) that designates whether the particular engineering elements are shareable or unshareable.

The engineering elements of an MBSE model are classified as "shareable" and "unshareable." Unshareable engineering elements refer to MBSE model data that includes sensitive, proprietary, or regulatory subject matter that may not be shared outside of an organization. Examples include, without limitation, engineering elements that are subject to export control regulations (e.g., International Traffic in Arms Regulations ("ITAR")); include secretive intellectual property (e.g., non-disclosed inventions, trade secrets, or the like); include proprietary information but a non-disclosure agreement (NDA) is not in place; include the proprietary information of other organizations that cannot be shared; or the like. On the other hand, shareable engineering elements refer to MBSE model data that includes subject matter that may be shared outside of an organization. Examples include, without limitation, engineering elements that are not subject to export control regulations; do not include secretive intellectual property; include proprietary information but an NDA is in place; include proprietary information of other organizations that is publicly available; or the like. Myriad reasons exist for sharing and not sharing engineering elements.

In some examples, the MBSE application is programmed to automatically determine which engineering elements of an MBSE model are shareable and which are unshareable through analyzing the metadata of the engineering elements. Some specific examples allow a user to apply tags to the MBSE model data that designate the various engineering elements of the MBSE model as either shareable or unshareable. For example, alphanumeric metadata tag values may be set to designate that shareable elements are not subject to export controls (e.g., ITAR or a specific Export Control Classification Number ("ECCN")); not inclusive of proprietary or confidential information; not inclusive of intellectual property; or the like. Similarly, alphanumeric metadata tag values may be set to designate that unshareable elements are subject to export controls (e.g., ITAR, ECCN, or the like); inclusive of proprietary or confidential information; inclusive of intellectual property; or the like.

Again, a user may set the metadata tags for the engineering elements of the MBSE model data, and these tags dictate which engineering elements are shareable and unshareable. Alternatively or additionally, the disclosed MBSE tools may include a macro, script, software routine, application program interface (API), or other code that autonomously (e.g., without user intervention) analyzes the metadata tagged to the engineering elements of an MBSE model and determines whether any of the elements are not labeled or incorrectly labeled. Such code may identify engineering elements that have no metadata tag at all or may look at descriptive properties of the engineering elements, such as, for example but without limitation, a descriptor of the elements, part number, project name, designer, or the like. For example, an element may have metadata with a property field indicating a particular type of technology that should have an export control, but the element may have a tag that does not specify that it is subject to export controls. Or, in another example, an element designed by a particular vendor that is subject to an NDA may not have an NDA tag. Both instances may be identified by the aforesaid code and automatically (without user intervention) tagged with appropriate metadata, e.g., export controls in the former case, and NDA in the latter.

Again, the restricted version of the MBSE model includes all of the engineering elements, both shareable and unshareable. The unrestricted version(s) include only shareable elements. In some embodiments, changes made to engineering elements in either version—restricted or unrestricted—may be transmitted to and incorporated in the other version. For example, a (shareable) engineering element in the unrestricted version that is changed may also be changed in the restricted version, and vice versa. Some embodiments, though not all, require manual authorization to send changes from the restricted version to the unrestricted version(s), because the restricted version includes sensitive (unshareable) elements. This manual authorization provides another level of protection over engineering changes, so that unshareable elements are not accidentally transmitted to outside organizations. In some examples, changes made to engineering elements of the unrestricted version may be propagated back to the restricted version without manual intervention, because the unrestricted version only includes model data that is shareable. Using the two different instances of the MBSE model—the restricted and unrestricted versions—both the internal organization and the external organization(s) are able to collaborate on MBSE projects, exchanging updates back and forth that are directly incorporated into the MBSE model being shared.

Having generally provided an overview of some of the disclosed examples, attention is drawn to the accompanying drawings to further illustrate additional details. The illustrated configurations and operational sequences are provided for to aid the reader in understanding some aspects of the disclosed examples. The accompanying drawings are not meant to limit all examples, and thus some examples may include different components, devices, or sequences of operations while not departing from the scope of the disclosed examples discussed herein. In other words, some examples may function or be embodied in different ways than those shown.

Figure 1:
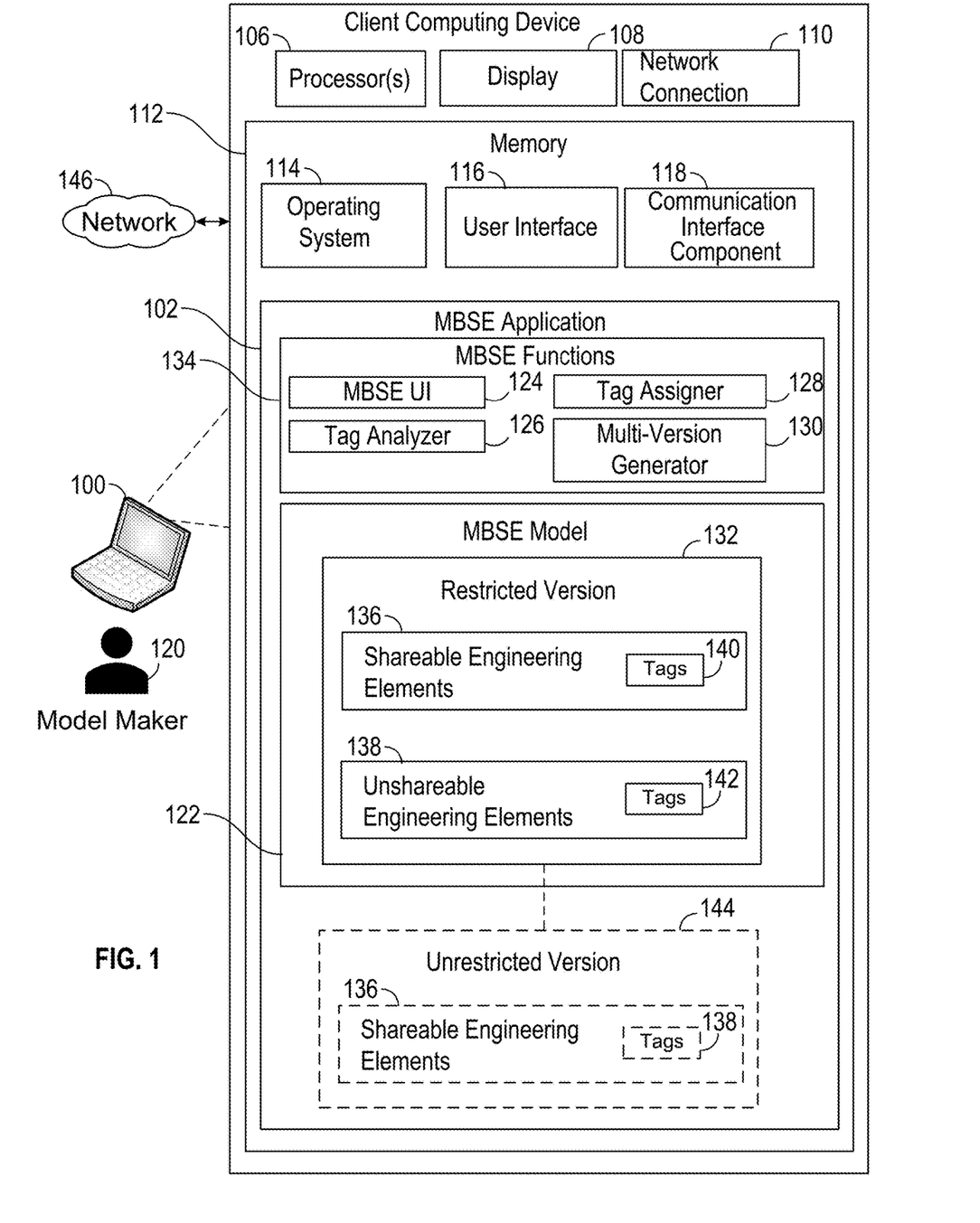
FIG. 1 illustrates a block diagram of a client computing device for creating restricted and unrestricted versions of an MBSE model in accordance with some of the disclosed examples.
Figure 2:
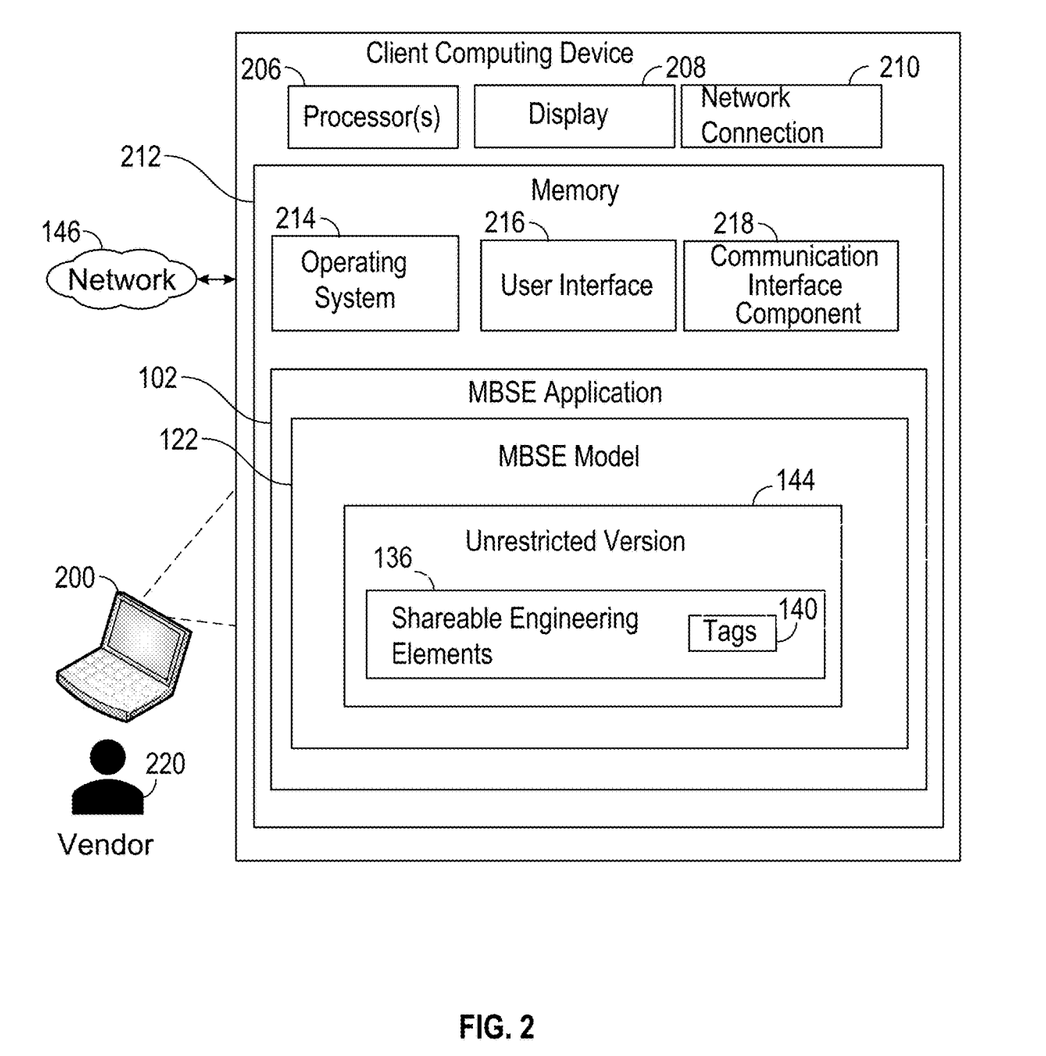
FIG. 2 illustrates a block diagram of a client computing device for an outside vendor to edit an unrestricted version of an MBSE model in accordance with some of the disclosed examples.

FIGS. 1 and 2 illustrate different client computing devices 100 and 200 that may be used by model makers and vendors, respectively. In particular, client computing device 100 in FIG. 1 may be used by a model maker inside of an organization to create restricted and unrestricted versions of an MBSE model, and client computing device 200 in FIG. 2 may be used by a user outside of an organization (e.g., at a vendor or supplier) to make changes to the MBSE model. This paradigm is carried throughout this disclosure, where a model maker, or someone inside of an organization, uses the disclosed MBSE applications to create the unrestricted versions of an MBSE model off of a restricted version of the model, and a user at an outside vendor is able to access the unrestricted version of the MBSE model and make changes thereto that may be sent back to the restricted version in front of the model maker.

More specifically, FIG. 1 illustrates a block diagram of a client computing device 100 configured to execute an MBSE application 102 for creating restricted and unrestricted versions of an MBSE model in accordance with some of the disclosed examples. The client computing device 100 represents any device executing instructions (e.g., as application programs, operating system functionality, or both) to implement the operations and functionality described herein associated with the computing device 100. In some examples, the client computing device 100 has one or more processor(s) 106, a display 108, a network connection 110, and computer-storage memory 112. Computing device 100 is but one example of a suitable computing environment that may be used for the various client computing devices and servers discussed herein. Though, computing device 100 is not intended to suggest any limitation as to the scope of use or functionality of the embodiments disclosed herein. Neither should the computing device 100 be interpreted as having any dependency or requirement relating to any one or combination of components/modules illustrated.

The client computing device 100 may take the form of a personal computer, laptop, virtual-reality headset, mobile tablet, smartphone, or the like. Other examples may incorporate the client computing device 100 as part of a multi-device system in which two separate physical devices share or otherwise provide access to the illustrated components of the computing device 100. While computing device 100 is depicted as a seemingly single device, multiple computing devices 100 may work together and share the depicted device resources. For instance, computer-storage memory 112 may be distributed across multiple devices, processor(s) 106 may provide housed on different devices, and so on.

The processor 106 may include any number of processing units and is programmed to execute computer-executable instructions for implementing aspects of this disclosure. The instructions may be performed by the processor or by multiple processors within the computing device or performed by a processor external to the computing device 100. In some examples, the processor 106 is programmed to execute instructions such as those illustrated in the other drawings discussed herein. In some examples, the processor 106 represents an implementation of analog techniques to perform the operations described herein. For example, the operations may be performed by an analog client computing device 100 and/or a digital client computing device 100.

The display 108 is configured to visibly present information on the computing device 100. Examples of displays include, without limitation, computer monitors, televisions, projectors, touch screens, phone displays, tablet displays, wearable device screens, televisions, speakers, vibrating devices, and any other display devices.

The computer-storage memory 112 includes any quantity of memory devices associated with or accessible by the computing device 100. Computer-storage memory 112 may take the form of the computer-storage media references below and operatively provide storage of computer-readable instructions, data structures, program modules and other data for the computing device 100 to store and access instructions configured to carry out the various operations disclosed herein. Computer-storage memory 112 may include memory device in the form of volatile and/or nonvolatile memory, removable or non-removable memory, data disks in virtual environments, or a combination thereof. And computer-storage memory 112 may include any quantity of memory associated with or accessible by the client computing device 100. Examples of client computing device 100 include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display 108.

The computer-storage memory 112 may be internal to the client computing device 100 (as shown in FIG. 1), external to the client computing device 100 (not shown), or both (not shown). Additionally or alternatively, the computer-storage memory 112 may be distributed across multiple client computing devices 100 and/or servers, e.g., in a virtualized environment providing distributed processing. For the purposes of this disclosure, "computer storage media," "computer-storage memory," "memory," and "memory devices" are synonymous terms for the computer-storage media, and none of these terms include carrier waves or propagating signaling.

In some examples, the computer-storage memory 112 stores executable computer instructions for an operating system (OS) 114, a user interface (UI) 116, a communication interface component 118, and the MBSE application 102. The OS 114 provides an operational environment for the computing device 100, and the user interface 116 provides graphical UIs on the display 108. The communication interface component 118 includes the transfer protocols and communication software necessary to communicate across a network 146 through the network connection 110.

The MBSE application 102 is an MBSE software application for a model maker 120 to build and manage an MBSE model 122. The MBSE application 102 includes one or more executable MBSE functions 134, including, for example, an application-specific UI (shown as MBSE UI 124), a tag analyzer 126, a tag assigner 128, and a multi-version generator 130. The MBSE UI 124 provides a client-side UI for the MBSE application 102. In some examples, the tag analyzer 126, the tag assigner 128, and the multi-version generator 130 represent code that are, together, executable to create a restricted version 132 of the MBSE model 122, as discussed in more detail below. In particular, the tag analyzer 126, the tag assigner 128, and the multi-version generator 130 may be an application program interface (API), script, or plug-in within the MBSE application 102.

While the MBSE functions 134 are shown as operating on the client computing device 100, alternative examples may host such functions, and the MBSE application 102, in a web- or cloud-based environment. Thus, the MBSE UI 124, tag analyzer 126, tag assigner 128, or multi-version generator 130 may be executed by remote servers, and the different versions of the MBSE model 122 be exposed to users over an Internet connection.

Operationally, the model maker 120 creates the MBSE model 122 using the MBSE application 102. The MBSE model 122 includes various engineering elements that are assembled with particular inputs and outputs for an engineering system (collectively "model data"). For example, a new type of airplane may have an MBSE model 122 that includes engines, a fuselage, electrical systems, and numerous other engineering systems. Some of the engineering elements for these systems and the parts may be subject to various regulatory, legal, and proprietary controls that forbid their sharing outside of the organization. For example, some parts or engineering elements may be subject to export controls (e.g., due to ITAR). Some may include proprietary trade secrets or other intellectual property (IP) that an organization has set controls against sharing externally. Still others may include confidential information that an existing NDA prohibits sharing.

The model maker 120 may specify which engineering elements of the MBSE model 122 may be shared (e.g., are shareable) and which may not be shared (e.g., are unshareable) in the MBSE application 102 by tagging, or otherwise associating, the engineering elements of the MBSE model 122 with different metadata. In other words, the MBSE application 102, in some examples, allows the model maker 120 (or others in the organization with tagging rights) to directly tag the engineering elements in order to control which ones are shared outside of an organization. For the shareable and unshareable elements, the metadata may include the metadata tags discussed herein that indicate whether the elements include subject matter related to particular export controls, proprietary information, IP, or the like.

The metadata of the engineering elements are used to classify which elements are shareable and unshareable outside of the organization. In some examples, the metadata is in the form of metadata tags 140 and 142 that are tagged, or associated with, the shareable engineering elements 136 and the unshareable engineering elements 138, respectively. The model maker 120 may create different instances of the MBSE model 122 for sharing with outside vendors. As previously discussed, a restricted version 132 of the MBSE model 122 includes all of the model's engineering elements: both shareable engineering elements 136 and the unshareable engineering elements 138. Metadata tags 140 and 142 are used to classify which elements may be shared and which may not. Thus, in some examples, the restricted version 132 of the MBSE model includes all of the engineering elements, both shareable engineering elements 136 and unshareable engineering elements 138, which makes sense because the restricted version is controlled by the model maker 120.

In some examples, the multi-version generator 130 generates an unrestricted version 144 of the MBSE model 122 from the restricted version 132. The difference between the two versions is that the unrestricted version 144 includes only shareable engineering elements of the MBSE model, as determined from their tags 139, but not the unshareable engineering elements 138. For example, elements with protected IP, that need an NDA, or that are subject to export controls are deemed, based on their metadata tags 140,142, to be unshareable, and therefore not included in the unrestricted version of the MBSE model 122. Once created, the unrestricted version 144 may be transmitted across a network 146 to an outside vendor. While some examples generate the unrestricted version 144 directly from the restricted version 132 of the MBSE model 122, other examples generate an intermediary version (called a "stripped version") of the restricted version 132, and then creates the unrestricted version 144 for outside vendors from the stripped version. This example is discussed in more detail in reference to FIG. 3.

Metadata tags 140,142 may not always be assigned by the model maker 120, or may be assigned incorrectly. In some examples, the tag analyzer 126 examines the metadata of the engineering elements and identifies any that are missing appropriate tags or that are tagged incorrectly. For those that are not tagged, tag analyzer 126 analyzes a property description of the untagged elements to determine which are shareable. Then, the tag assigner 128 may assign a tag value that corresponds to the property description. For example, if an untagged element is a "missile fuselage," the tag assigner 128 may include rules that specify the keyword "missile" automatically triggers an export control tag. In another example, if an untagged element lists a particular part number or product name that has not yet been publicly release, the tag assigner 128 may assign an "IP" tag specifying that the element includes non-disclosed intellectual property.

Additionally or alternatively, the tag analyzer 126 may identify which elements are incorrectly tagged by reviewing the property descriptions and the assigned tags to determine whether they correspond to each other. For example, the tag analyzer 126 may identify a tag of "free," designating an element is able to be shared, is incorrect when its part number is to a technology that is subject to export control. Once the mismatch is identified, the tag assigner 128 may automatically assign a more relevant tag, without having to get the model maker 120 to intervene.

The network 146 may include any computer network or combination thereof. Examples of computer networks configurable to operate as network 146 include, without limitation, a wireless network, landline, cable line, fiber-optic line, local area network (LAN), wide area network (WAN), metropolitan area network (MAN), or the like. Network 146 is not limited, however, to connections coupling separate computer units. Rather, network 146 may also comprise subsystems that transfer data between servers, base stations, or computing devices. For example, network 146 may also include a point-to-point connection, the Internet, an Ethernet, wireless fidelity (Wi-Fi); cellular (e.g., 3G, 4G, 5G, etc.); or the like. In an embodiment where network 146 comprises a LAN networking environment, components are connected to the LAN through a network interface or adapter. In an embodiment where network 146 comprises a WAN networking environment, components use a modem, or other means for establishing communications over the WAN, to communicate. In embodiments where network 146 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are merely examples and, other means of establishing a communications link between computing devices may also be used.

FIG. 2 illustrates a block diagram of a client computing device 200 for an outside vendor 220 to edit the unrestricted version 144 of the MBSE model 122 in accordance with some of the disclosed examples. The vendor 220 represents a user at an external organization of the model maker 120 discussed above. Specifically, The client computing device 200 includes its own processor 206, display 208, network connection 210, computer-storage memory 212, UI 216, and communication interface component 218 that are similar to the equivalent components discussed above in the client computing device 100 of the model maker 120. Additionally, a client-side instance of the MBSE application 102 is stored, and runs, in the computer-storage memory 212, and allows the vendor 220 to access and collaborate on the MBSE model 122 using the unrestricted version 144. Thus, the unrestricted version 144, which is created from the restricted version 132 or a stripped version (disclosed below), is accessed via the network 146 by the vendor 220 on the client computing device 200.

In operation, the model maker 120—or other users with access rights in the internal organization—access and work off of the restricted version 132 of the MBSE model 122. Other users at external organizations (represented by the vendor 220) access and work off the unrestricted version 144 of the MBSE model 122. The unrestricted version 144 only includes the shareable engineering elements 136, so that is all the vendor 220 may see of the MBSE model 122. As the vendor 220 and model maker 120 collaborate on the MBSE model 122 using the unrestricted version 144 and the restricted version 132, respectively, either party may make changes to the shareable engineering elements 136, and the changes may be incorporated into the MBSE model 122. In some examples, changes that the vendor 220 makes to the shareable engineering elements 136 in the unrestricted version 144 may be sent to and incorporated in the restricted version 132 seen by the model maker 120, and vice versa.

In some examples, changes made by the vendor 220 in the unrestricted version 144 are automatically implemented in the restricted version 132, but changes made by the model maker 120 require manual authorization before being propagated to the unrestricted version 144. This provides another fail-safe for the model maker 120 to be sure that changes made on their end do not accidentally expose critical information outside of the organization. Other embodiments automatically propagate changes from the restricted version 132 to the unrestricted version 144, without model maker 120 authorization. Still other embodiments require manual authorization from the vendor 220 before changes made in the unrestricted version 144 are incorporated in the restricted version 132. Various change management rules may be implemented by the server discussed below in reference to FIG. 3.

Also, some examples restrict the information transmitted from the unrestricted version 144 back to the restricted version 132. Just as the model maker 120 of the internal organization may way to keep various engineering elements secret from the vendor 220 of the external organization, the opposite may be true as well: the vendor 220 may need to keep some portions of the unrestricted version 144 hidden from the model maker 120. For example, if the internal organization of the model maker 120 is an airplane manufacturer that contracts with an external organization to build an engine, the vendor 220 at the external organization may need to keep various proprietary or export-controlled portions of the designed engine in the unrestricted version 144 hidden from the model maker 120 and their internal organization. To accommodate the vendor 220, some examples allow the vendor to tag any of the shareable engineering elements 136 in the unrestricted version 144 in a manner that stops the so-tagged element from being shared. For example, an engineer at the engine company may modify the shareable engineering elements 136 to include particular engine designs and tag those designs as proprietary, confidential, or IP-related, and the MBSE application 102 is configured to not transmit these changes or additions to the shareable engineering elements 136 back to the restricted version 132. Thus, some disclosed examples provide a mechanism for the vendor 220 to hide its own unshareable engineering elements from the restricted version 132.

Any number of unrestricted versions 144 may be created and specifically include shareable engineering elements 136 that are meant for different external organizations. For example, unrestricted version 144A may be created for an engine manufacturer, unrestricted version 144B may be created for an electrical system manufacturer, unrestricted version 144C may be create for a seat manufacturer, and so on. These different unrestricted versions 144A-C may include different shareable engineering elements 136 based on the external organization. For example, one organization may be under NDA with the internal organization and may therefore include some proprietary elements compared to other organizations. Or, in another example, an external organization that is in the same country as the internal organization may not pose a risk for export control laws, and therefore may receive some shareable engineering elements 136 that are tagged as export control-related. Myriad other examples exist and cannot be exhaustively provided herein, but it should be noted that different unrestricted versions 144 may include different shareable engineering elements 136.

Figure 3:
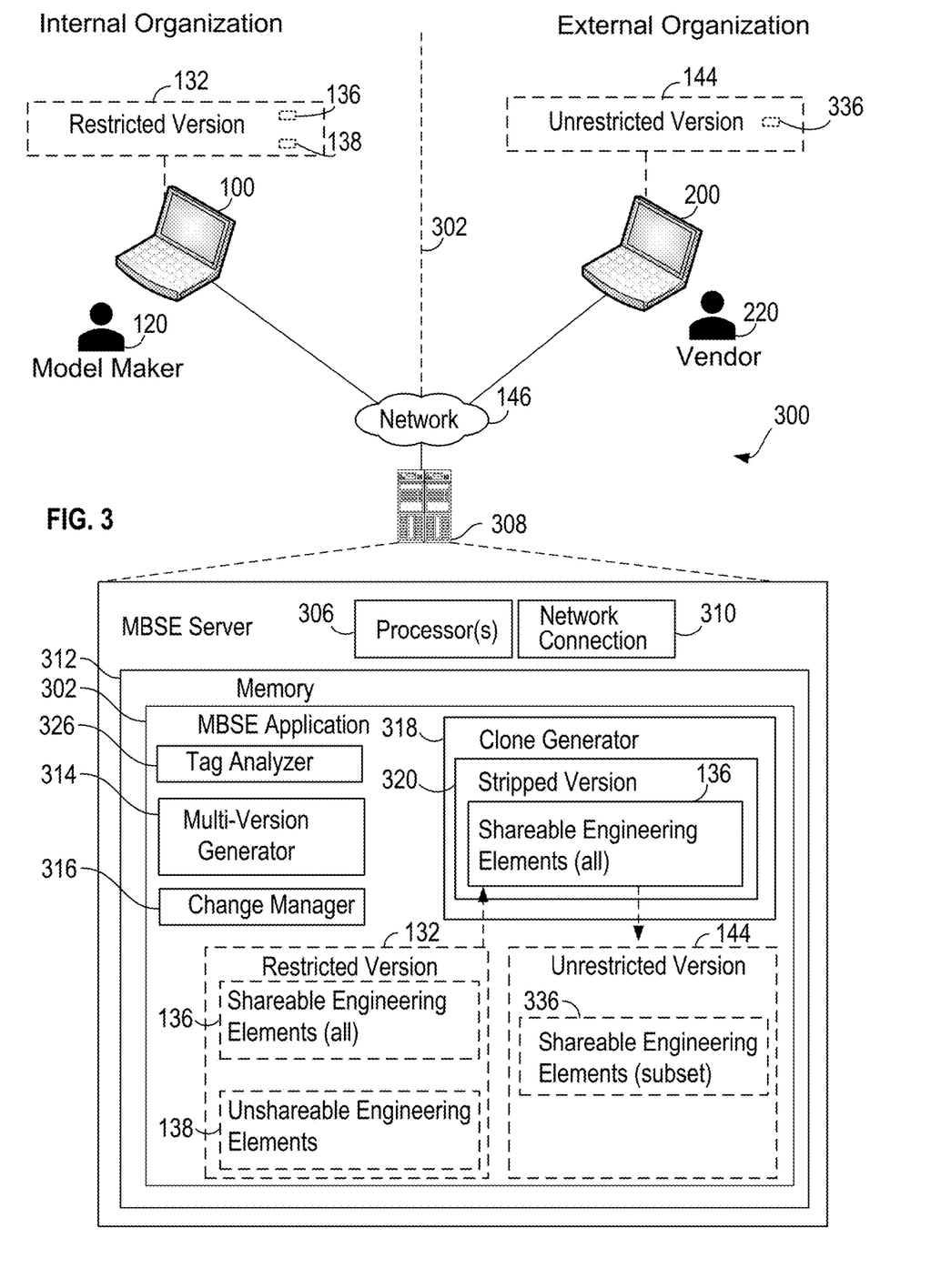
FIG. 3 illustrates a block diagram of a networking environment for an MBSE model maker and a vendor to collaborate on an MBSE model using restricted and unrestricted versions in accordance with the disclosed examples.

FIG. 3 illustrates a block diagram of a networking environment 300 for an MBSE model maker 120 and a vendor 220 to collaborate on the MBSE model 122 using restricted and unrestricted versions in accordance with the disclosed examples. In the depicted example, the model maker 120 and the vendor 220 are in separate organizations: the internal organization and the external organization, respectively. Dotted line 303 represents that the internal organization and the external organization are actually different organizations. The model maker 120 uses client computing device 100 to create the MBSE model 122, as well as the restricted version 132 thereof. The vendor 220 uses client computing device 200 to access the unrestricted version 144 of the MBSE model 122 that was created from the restricted version 132—or, more specifically, created to include all or a subset of the shareable engineering elements 136.

In some examples, a remote server, shown as MBSE server 308, generates the unrestricted version 144 by first creating a stripped version 346 that includes all of the shareable elements 136 of the MBSE model. The MBSE server 308 represents one or more servers configured with one or more processors 306, network connection 310, computer-storage memory 312 that are similar to the equivalent components discussed above. Additionally, a server of the MBSE application (MBSE application 302) is stored, and runs, in the computer-storage memory 212. The MBSE application includes executable code comprising: a tag analyzer 326, a multi-version generator 314, a change manager 316, and a clone generator 318. Operatively, the server-based MBSE application 302 is configured to create the unrestricted version 144, either directly from the restricted version 132 or through an intermediary version referred to as a "stripped version" 320, which is discussed in more detail below.

In particular, the tag analyzer 326 operates in the same manner as the tag analyzer 126 discussed in relation to FIG. 1. The depicted examiner in FIG. 3 illustrates that the tag analyzer 326 may alternatively be hosted on the MBSE server 308 in some embodiments instead of being on the client computing device 100, as shown in FIG. 1.

In operation, the multi-version generator 330 that is configured to generate the unrestricted version 144 of the MBSE model 122 in various ways. In some examples, the multi-version generator 330 creates the unrestricted version 144 directly from the restricted version 132, which is accessible on the client computing device 100 over the network 146. In such examples, the model maker 120 may initiate creation of the unrestricted version 144 using the aforementioned MBSE UI 124, and the MBSE application 102 on the client computing device 100 communicates with the MBSE application 302 on the MBSE server 308 to access the shareable elements 136 of the MBSE model 122 and generate the unrestricted version 144 therefrom. Thus, in some embodiments, the unrestricted version 144 may be created directly from the restricted version 132.

The shareable engineering elements 136 to include in the so-generated unrestricted version 144 of the MBSE model 122 may depend on the external organization, the access rights of the vendor 220, or both. For example, a vendor that is developing an airplane's fuselage may not see engineering elements that are associated with the airplane's wings. In other words, the unrestricted version 144 of the MBSE model 122 may include just a subset of the shareable engineering elements 136.

Alternatively, in other examples, the multi-version generator 330 uses the clone generator 318 to first create the intermediary stripped version 320 of the restricted version 132. In some examples, the stripped version 320 includes all of the shareable elements 136, though not the unshareable elements 138. The multi-version generator 314 may then generate the unrestricted version 144 from the stripped version 320. This instance of the unrestricted version 144 created from the stripped version 320 includes all or a subset of the shareable engineering elements 136, as shown by the differently numbered shareable engineering elements (subset) 336. Thus, such examples generate the unrestricted version 144 from the intermediary stripped version 320, which is generated from the restricted version 132.

The change manager 316 incorporates changes made by the model maker 120 (or the vendor) into the different versions of the MBSE model 122. The change manager 316 represents various executable rules for how changes may be incorporated into the MBSE model 122. As discussed in more detail below, some examples automatically change the restricted version 132 whenever the vendor 220 makes a change to the shareable engineering elements 336 of the unrestricted version 144. For example, a vendor 220 changing a fuselage design may have those changes automatically migrated to and changed in the restricted version 132 from which the model maker 120 is working. Additionally, changes made to shareable engineering elements 136 in the restricted version 132 by the model maker 120 may be automatically transmitted and incorporated into the unrestricted version 144. Alternative embodiments require manual authorization from the model maker 120 before changes made to the restricted version 132 are propagated to the unrestricted version 144.

The depicted example is just one possible scenario. Alternatively, multiple users may act as the model maker 120 and multiple others may act as the vendor 220 based on access rights, instead of being inside and outside of a particular organization. For example, multiple people inside or outside of the internal organization may have access rights to view restricted versions and create unrestricted versions of MBSE models (and thus qualify as the model maker 120). Moreover, multiple people inside or outside of the internal organization may not have such rights, and thus only allowed to view and edit the unrestricted versions of MBSE models. Also, only a single person is shown as the model maker 120 and another as the vendor 220. Yet, these users may include any number of people. For instance, there may be ten "model makers" and five "vendors."

As previously discussed, conventional MBSE software does not allow for some information of an MBSE model to be hidden from external organizations during collaboration. The examples discussed herein enable such collaboration by providing different versions of a given MBSE model for them each to work on: the restricted version 132 for the model maker 120, and the unrestricted version 144 for the vendor 220. Using the disclosed unrestricted versions of the MBSE model, different users across different organizations may seamlessly collaborate directly on the same MBSE model. This saves time and dramatically reduces errors compared to conventional MBSE software tools.

Figure 4:
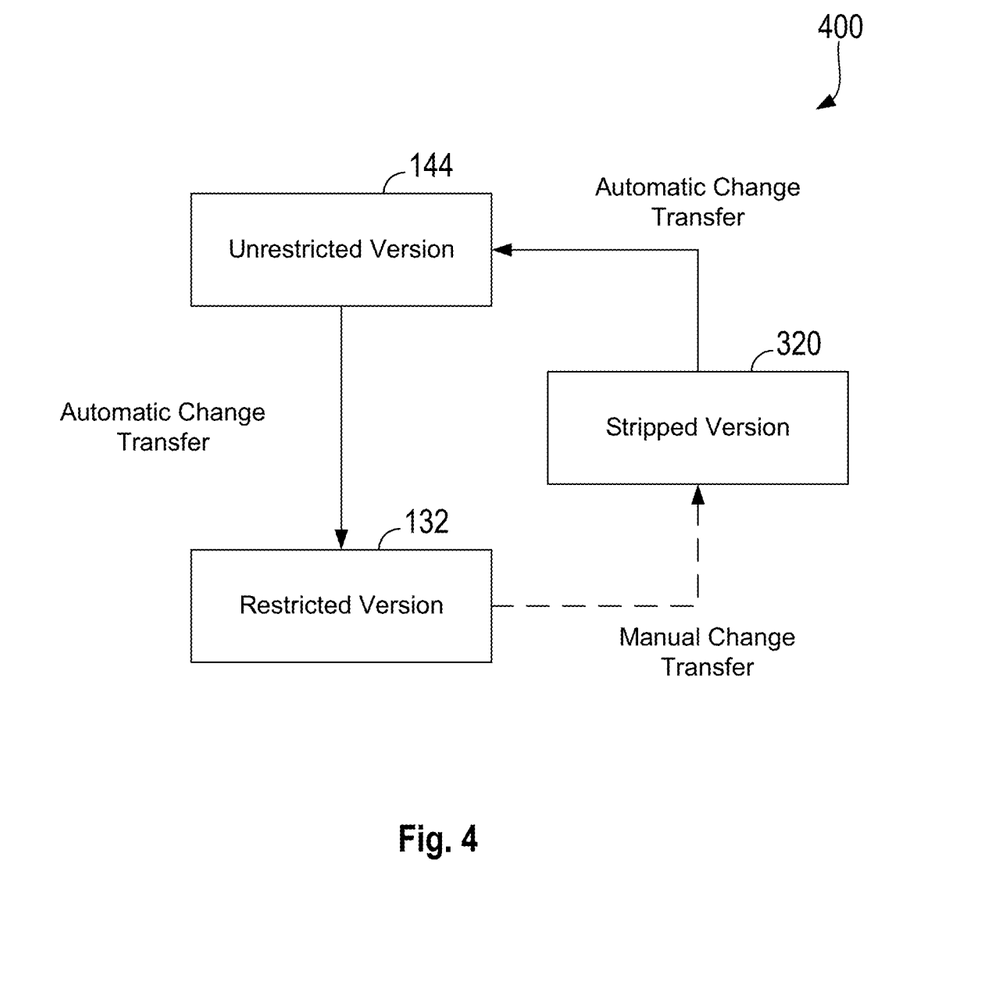
FIG. 4 illustrates a block diagram of an information flow for changes to move between a restricted version, unrestricted version, and stripped version of an MBSE model in accordance with the disclosed examples.

FIG. 4 illustrates a block diagram of an information flow 400 showing how changes are transferred between the restricted version 132, the unrestricted version 144, and the stripped version 320 of the MBSE model 122, according to some examples. Generally speaking, some examples automatically implement changes made in the unrestricted version 144 (e.g., by the vendor 220) to the restricted version 132. Information flow 400 shows that changes are automatically transferred from the unrestricted version 144 to the restricted version 132. Changes made to the MBSE model 122 in the restricted version 132 may require manual authorization before being migrated to the unrestricted version 144. These changes may be pushed to the restricted version 132 upon being made or pulled from the unrestricted version 144 by the restricted version 132 periodically. Conventional software does not allow for changes made by outside vendors to automatically be implemented in the MBSE models viewed by model makers. Thus, the examples discussed herein provide a much more streamlined approach to collaborating on MBSE models with folks outside of an organization.

In some examples, changes in the restricted version 132 require a "manual change transfer," meaning a user must first authorize the changes to be transferred, and if so, the changes are first transferred to the stripped version 320 before being automatically transferred to the unrestricted version 144. Requiring manual authorization first provides a human fail-safe to check whether changes being transferred to the unrestricted version 144 actually should not be shared. Also, filtering changes through the stripped version 320 also helps control the changes going to the correct unrestricted version 144. For example, the disclosed embodiments may create multiple different unrestricted versions 144 for different outside vendors. So having one repository for changes to all of the shareable elements 136 that is separate from the restricted version 132 provides a layer of protection for the unrestricted version 144, because the unrestricted version 144 cannot access changes from it directly, and must receive changes from the stripped version 320 instead.

Figure 5:
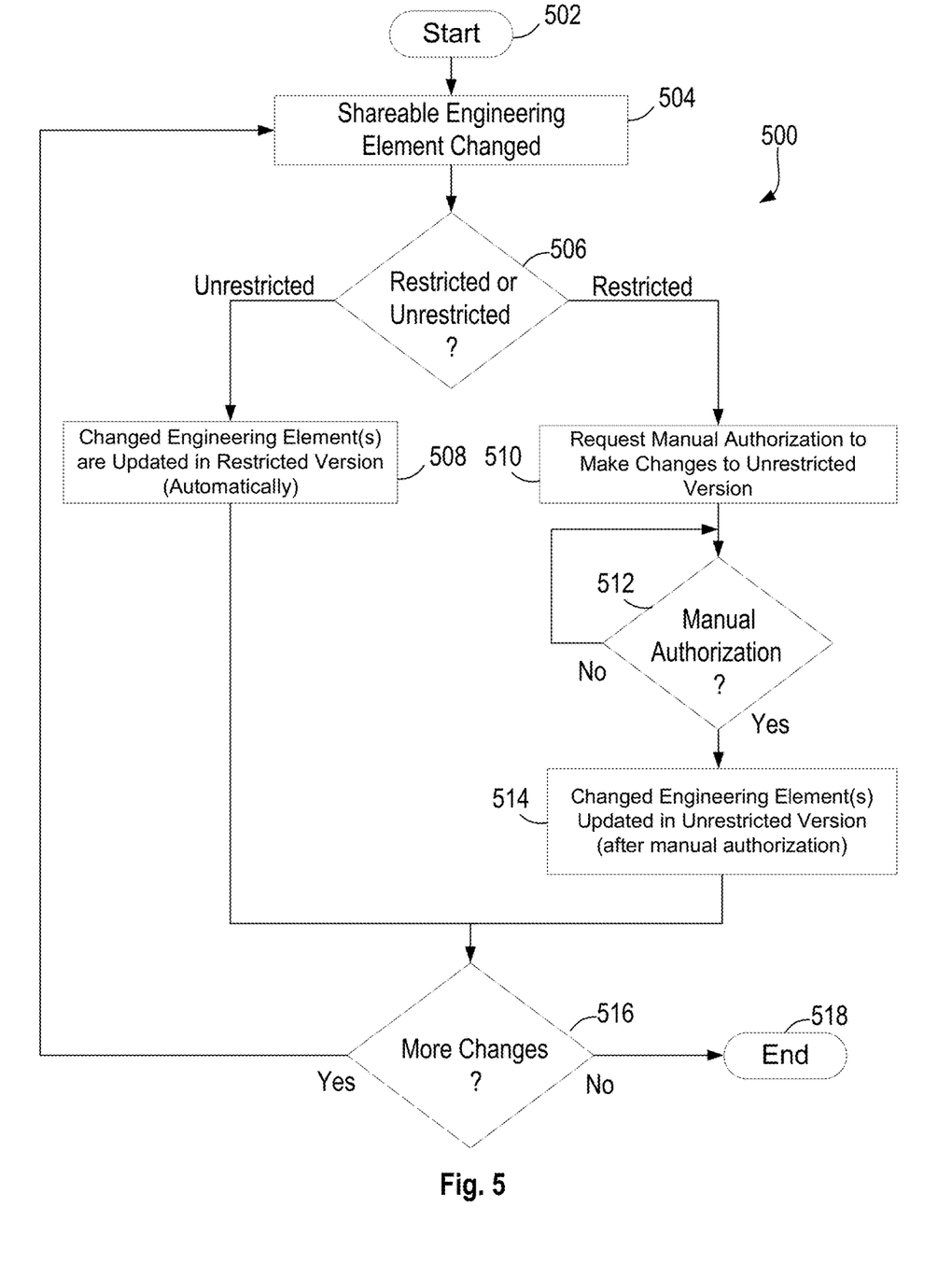
FIG. 5 illustrates a workflow diagram showing changes being transferred between the different versions of an MBSE model in accordance with some of the disclosed examples.

FIG. 5 illustrates a workflow diagram showing a workflow 500 for transferring changes between the different versions of the MBSE model 122, according to some of the disclosed examples. In some examples, workflow 500 is implemented by the change manager 316 of the MBSE server 308. The workflow 500 begins at start block 502, and a change is made to the one of the shareable engineering elements, as shown at 504. The change manager 316 determines whether such change was made in the restricted version 132 or the unrestricted version 144, as shown at 506. If the change is made in the unrestricted version 144, the changes made to the shareable engineering elements 336 of the unrestricted version 144 are automatically made in the shareable elements 136 of the restricted version 132, i.e., the changes are automatically migrated to the restricted version 132. This is shown at 502.

If the change is made in the restricted version 132, the model maker 120 (or another users with rights to change the restricted version 132) is notified with a request to provide manual authorization to propagate the changes to the unrestricted version 144, as shown at 510. As shown at 512, the workflow 500 waits until such user authorization is obtained. Once it has been, the changes to the shareable engineering elements 136 of the restricted version 132 are propagated either: (1) directly to the unrestricted version 144 (in some examples); or (2) first to the stripped version 320, and then to the unrestricted version 144 (in other examples). This is shown at 514, which clarifies that changes are only transmitted after user authorization, in one particular example. Alternative examples do not require the aforesaid manual authorization in 512. Instead, such examples automatically migrate changes made in the restricted version 132 to the unrestricted version 144 (or stripped version 320 first) once the change is made. Thus, changes in the restricted version 132 may be automatically implemented or manually controlled, depending on the embodiment.

Figure 6:
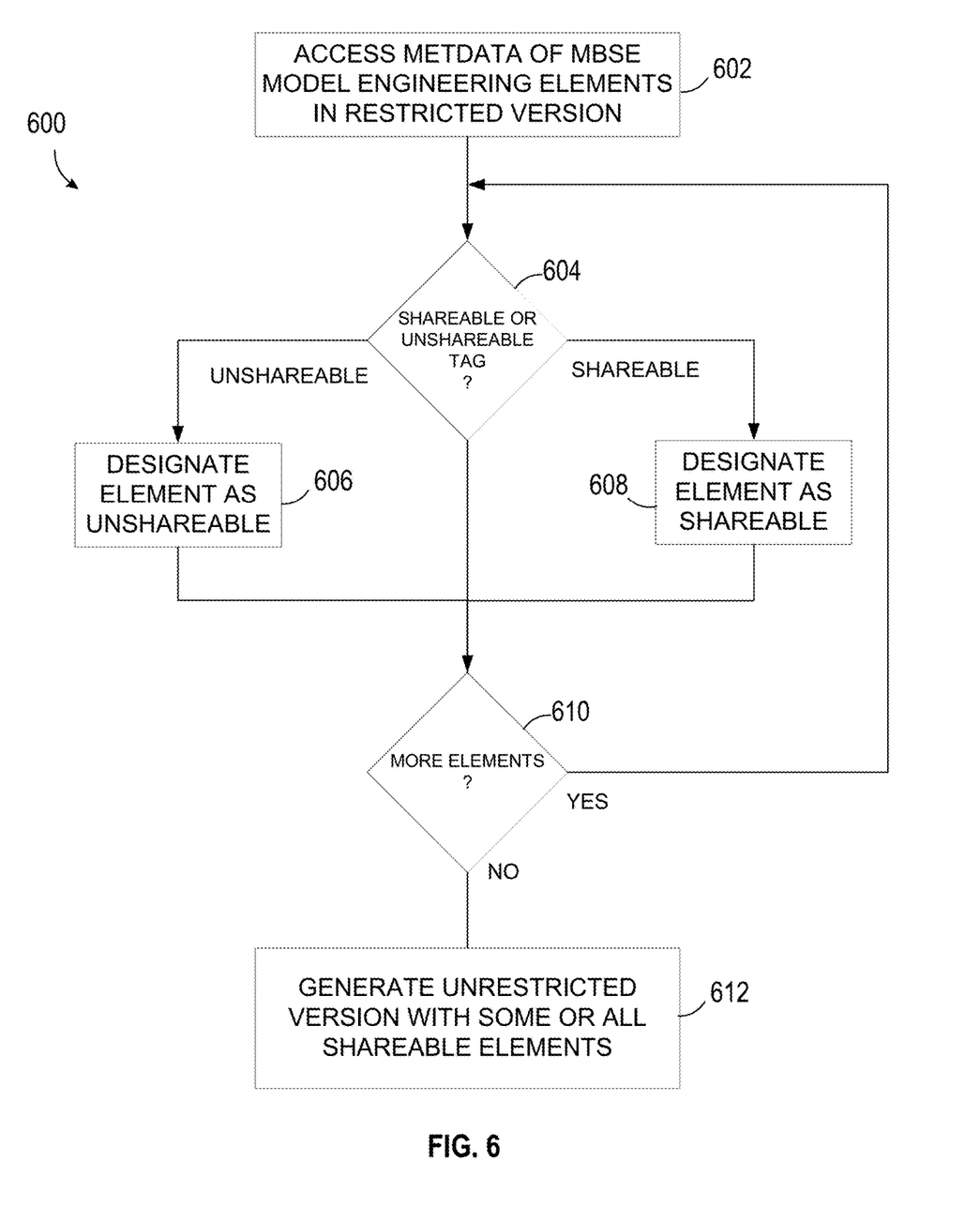
FIG. 6 illustrates a workflow diagram showing a workflow for creating an unrestricted version directly from a restricted version of an MBSE model in accordance with some of the disclosed examples.

FIG. 6 illustrates a workflow diagram showing a workflow 600 for creating the unrestricted version 144 from the restricted version 132 of the MBSE model 122, according to some examples. In particular, workflow 600 represents an example where the unrestricted version 144 is created directly from restricted version 132, without using the intermediary stripped version 320. The latter embodiment, which uses the stripped version 320, is illustrated in workflow 700 of FIG. 7 and described in more detail below.

As shown at 602 in FIG. 6, metadata for all the engineering elements of the MBSE model 122 are accessed. For each element, its underlying metadata tag 140 or 142 is analyzed to determine whether the element is shareable or unshareable, as shown at 604. Metadata tags 142 associated with items that are not to be shared outside of an internal organization (e.g., export control, IP, or other non-disclosable elements) are designated as an unshareable element, as shown at 606, and are not included in the unrestricted version 144. Metadata tags 140 associated with items that are shareable outside of an internal organization (e.g., export control, IP, or other non-disclosable elements) are designated as a shareable element, as shown at 608, and may be included in the unrestricted version 144. As shown at 610, the classification of elements as shareable or unshareable based on their tagged metadata is repeated for all of the engineering elements of the MBSE model 122.

Once the engineering elements have been classified, the unrestricted version 144 is then generated with all or at least some of the shareable elements, as shown at 612. As previously discussed, the multi-version generator 130 in a client-side version of the MBSE application 102 may generate the unrestricted version 144 from the restricted version 132. Also, it should be noted again that not all shareable engineering elements may be included in the unrestricted version 144.

Additionally, shareable engineering elements may be selected for inclusion in the unrestricted version 144 based on the intended vendor 220 or the external organization. For example, shareable engineering elements related to a fuselage manufactured by Company A may not be included in the unrestricted version 144 meant for Company B that manufactures airplane seats, and vice versa. Thus, the shareable engineering elements may be filtered for the unrestricted version 144 based on the intended recipient or vendor. This filtering based on recipient may also be triggered based on the metadata of the engineering elements. For example, metadata property values indicating the specific type of engineering element (e.g., fuselage body, speakers, etc.), part number, part type, or other descriptive indicator may be analyzed to select which shareable elements to include in the unrestricted version 144.

Figure 7:
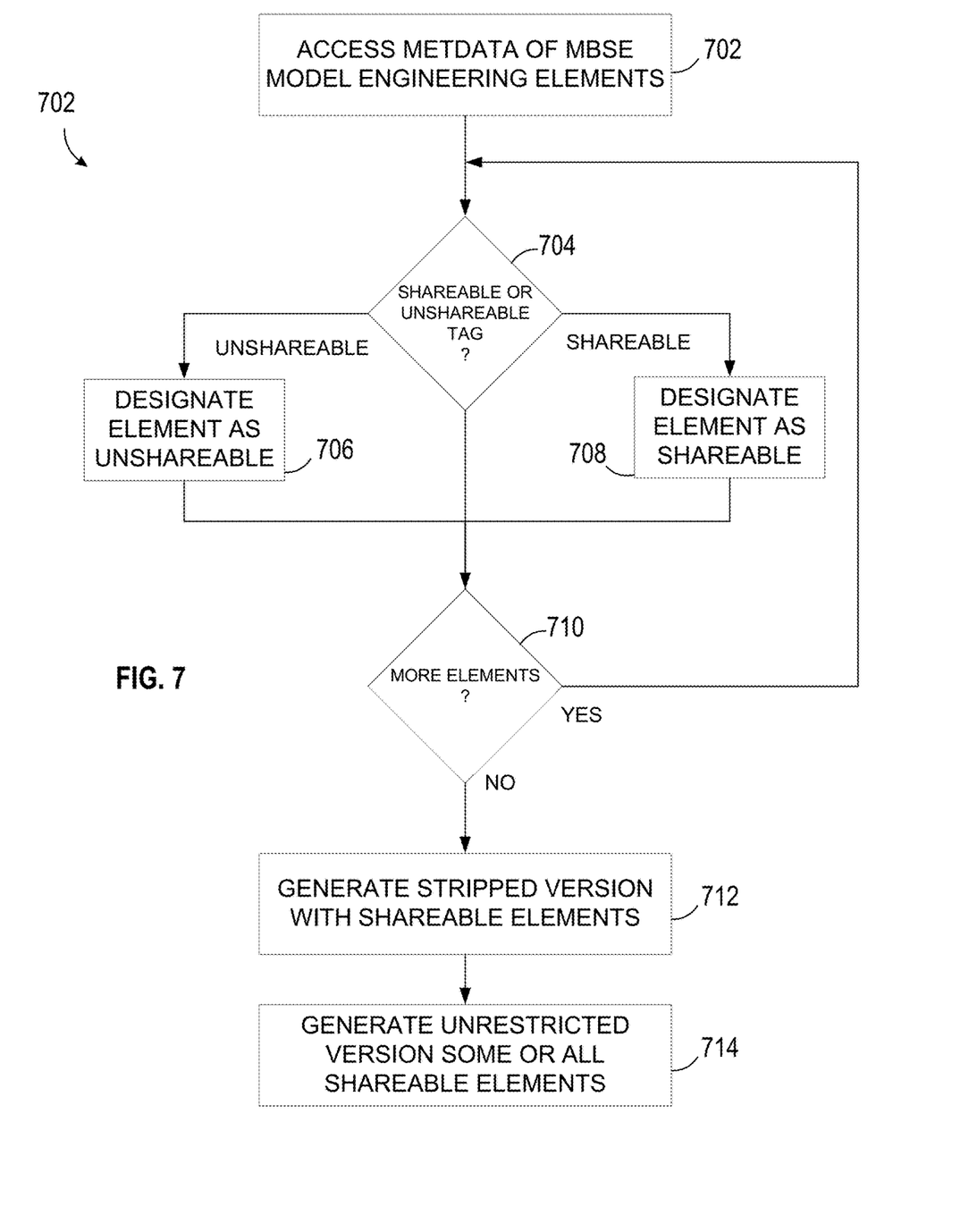
FIG. 7 illustrates a workflow diagram showing a workflow for creating an unrestricted version from a restricted version of an MBSE model using an intermediary stripped version in accordance with some of the disclosed examples.

FIG. 7 illustrates a workflow diagram showing a workflow 700 for creating the unrestricted version 144 from the restricted version 132 of the MBSE model 122 using the intermediary stripped version 320, according to some examples. In particular, workflow 700 stripped version 320 is created from the restricted version 132, and then the unrestricted version 144 is created from the stripped version 320.

As shown at 702, metadata for all the engineering elements of the MBSE model 122 are accessed. For each element, its underlying metadata tag is analyzed to determine whether the element is shareable or unshareable, as shown at 704. Metadata tags associated with items that are not to be shared outside of an internal organization (e.g., export control, IP, or other non-disclosable elements) are designated as an unshareable element, as shown at 706, and are not included in the stripped version 320. Similarly, metadata tags associated with items that are shareable outside of an internal organization (e.g., export control, IP, or other non-disclosable elements) are designated as a shareable element, as shown at 708, and are included in the stripped version 320. As shown at 710, the classification of elements as shareable or unshareable based on their tagged metadata is repeated for all of the engineering elements of the MBSE model 122.

Once the engineering elements have been classified, the stripped version 320 is then generated with all of the shareable elements, as shown at 712. As previously discussed, the clone generator 318 on the MBSE server 308 may generate the stripped version 320 from the restricted version 132. And the unrestricted version 144 may then be generated from the stripped version, as shown at 714. Again, the unrestricted version 144 may include some or all of the shareable engineering elements, depending on the intended vendor 220 or related external organization.

Once the unrestricted versions 144 of the MBSE model 122 are generated, regardless of whether done through the intermediary stripped version 320 or not, changes made to engineering elements may be propagated back from the unrestricted versions 144 to the restricted version 132 using the previously discussed change-management tools and procedures. The MBSE applications 102 and 302 described above may take a change made by the vendor 220 to a shareable element in an unrestricted version 144 and change the same shareable element in the restricted version 132 to reflect the change. Similarly, the MBSE applications 202 and 302 described above may take a change made by the model maker 120 to a shareable element in the restricted version 132 and change the same shareable element in an unrestricted version 144 of the vendor 220 to reflect the change.

ADDITIONAL EXAMPLES

The following paragraphs describe further aspects of the disclosure:

1A. A method for information management in model-based systems engineering (MBSE) modeling, the method comprising:
accessing metadata associated with a plurality of engineering elements in an MBSE model;
determining, from the accessed metadata, which of the plurality of engineering elements are shareable elements and which are unshareable elements; and
generating an open version of the MBSE model being void of the unshareable elements.

2A. The method of clause 1A, further comprising:
receiving a change made to a shareable element in the restricted version of the MBSE model; and
transmitting the change made to the shareable element from the restricted version to the open version of the MBSE model.

3A. The method of any of clauses 1-2A, wherein said generating the open version of the MBSE model comprises:
creating a stripped version of the MBSE model that includes only the shareable elements; and
generating the open version of the MBSE model from the created stripped version.

4A. The method of clause 3A, further comprising:
receiving, at the stripped version of the MBSE model, a change to a shareable element made in the restricted version;
transmitting the change to the shareable element from the stripped version of the MBSE model to the open version; and
implementing the change to the shareable element in the one or more of the shareable elements of the open version.

5A. The method of clause 4A, wherein transmission of the change to the open version is initiated upon a user instruction.

6A. The method of any of clauses 1-2A, further comprising:
transmitting a change to the one or more shareable elements of the open version to the restricted version of the MBSE model; and
changing the one or more shareable elements in the restricted version of the MBSE model.

7A. The method of any of clauses 1-6A, wherein the metadata comprises tags for the plurality of engineering elements.

8A. The method of any of clauses 1-8A, wherein the unshareable elements have tags indicating respective engineering elements are subject to export controls or include proprietary information not to be shared outside of an organization.

9A. The method of any of clauses 1-9A, wherein the shareable elements have tags indicating respective engineering elements are covered by a non-disclosure agreement.

10A. The method of any of clauses 1-9A, wherein the metadata for the plurality of engineering elements is designated by a user.

11A. The method of clause 1A, further comprising:
analyzing the metadata associated with the plurality of engineering elements to identify untagged elements;
analyzing property descriptions of the untagged elements to determine which are shareable; and
updating the metadata to tag at least one of the untagged elements to indicate the at least one tagged element is shareable.

12A. The method of clause 1A, further comprising:
analyzing the metadata associated with the plurality of engineering elements to identify incorrectly tagged elements;
analyzing property descriptions of the incorrectly tagged elements to determine which are shareable; and
updating metadata tags to indicate at least one of the incorrectly tagged elements is shareable.

13A. The method of clause 1A, further comprising:
determining an intended external organization for the open version; and
selecting one or more of the shareable elements of the MBSE model for the open version based, at least in part, on the intended external organization.

14A. The method of any of clauses 1-13A, wherein the unrestricted version of the MBSE model comprises one or more snapshots of the one or more of the shareable elements of the MBSE model determined from the accessed metadata.

15A. A system for information management in model-based systems engineering (MBSE) modeling, the system comprising:
memory storing a restricted version of an MBSE model, the restricted version comprising a plurality of engineering elements of the MBSE model and metadata associated with the plurality of engineering elements; and
one or more processors programmed to:
access the metadata associated with the plurality of engineering elements of the MBSE model;
determine, from the accessed metadata, which of the plurality of engineering elements are shareable elements and which are unshareable elements; and
generate an open version of the MBSE model being void of the unshareable elements.

16A. The system of clause 15A, wherein the metadata comprises tags that are set by one or more users for the plurality of engineering elements.

17A. The system of any of clauses 15-16A, wherein the metadata comprises tags associated with the shareable elements, the tags indicating engineering elements that are subject to export control or that are proprietary.

18A. The system of any of clauses 15-17A, wherein the one or more processors are further programmed to:
receive an instruction from a user to migrate a change to a shareable element made in the restricted version of the MBSE model to the open version; and
incident to the instruction from the user to migrate the change, transmit a second snapshot of the one or more of the shareable elements with the change to the shareable element.

19A. One or more computer memory embodied with computer-executable instructions for information management in MBSE modeling, the one or more computer memory comprising:
a tag analyzer configured for accessing metadata associated with a plurality of engineering elements in a restricted version of an MBSE model;

a multi-version generator configured for creating a stripped version of the restricted version of the MBSE model, the stripped version comprising only shareable elements of the MBSE model determined through analyzing the accessed metadata;

a clone generator configured for generating an open version of the MBSE model from the stripped version, the open version including one or more of the shareable elements and being void of the unshareable elements of the MBSE model; and an MBSE application configured for receiving, at the restricted version, a first change made by a user to a first shareable element in the open version and changing the first shareable element in the restricted version based on the received first change.

20A. The one or more computer memory of clause 19A, further comprising a change manager further configured for:

receiving, at the restricted version, a second change to a second shareable element;

requesting user authorization to make the second change to the second shareable element in the open version;

receiving the user authorization; and transmitting the second change of the second shareable element for implementation in the open version.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the drawings and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for information management in model-based systems engineering (MBSE) modeling, the method comprising:

providing a collaborative environment including a computing system in communication via a network with a client device associated with a first user, the computing system having a processor and memory, the memory storing an MBSE model;

accessing, by the processor, metadata associated with a plurality of engineering elements in the MBSE model, wherein the plurality of engineering elements relate to production of a product or service, wherein the metadata comprises tags for the plurality of engineering elements, wherein the plurality of engineering elements comprises shareable elements and unshareable elements, wherein tags assigned to shareable elements indicate respective engineering elements that are shareable outside of an organization, and wherein tags assigned to unshareable elements indicate respective engineering elements that are subject to export controls or include proprietary information not to be shared outside of the organization;

determining, by the processor from the accessed metadata, which of the plurality of engineering elements are shareable elements and which are unshareable elements by analyzing the tags associated with the plurality of engineering elements;

generating, by the processor, an open version of the MBSE model from a restricted version of the MBSE model by stripping each unshareable element out of the restricted version of the MBSE model such that the open version of the MBSE model is void of the unshareable elements;

sending, via the network, the open version of the MBSE model to the first user outside of the organization, the first user not having authorization to access the restricted version;

receiving, via the network, an updated open version of the MBSE model based on an update to the open version of the MBSE model from the first user, the update including a change made to a shareable element in the open version of the MBSE model, the change made to the shareable element including an element comprising a tag that stops the tagged element from being shared in the open version of the MBSE model and the restricted version of the MBSE model;

generating, from the updated open version of the MBSE model, an updated restricted version of the MBSE model, the updated restricted version of the MBSE model comprising each of the unshareable elements, each of the shareable elements, and the change made to the shareable element by the first user without the tagged element; and displaying the updated restricted version of the MBSE model to a second user inside of the organization, the second user having authorization to access the restricted version and the updated restricted version of the MBSE model.

2. The method of claim 1, further comprising:
receiving a change made to an unshareable element and a change made to a first additional shareable element in the restricted version of the MBSE model; and
transmitting the change made to the first additional shareable element from the restricted version to the open version of the MBSE model without transmitting the change made to the unshareable element.

3. The method of claim 1, wherein generating the updated restricted version of the MBSE model further comprises requesting an authorization of a third user prior to implementing the update.

4. The method of claim 3, further comprising:
receiving, at a stripped version of the MBSE model, a change to a second additional shareable element made in the restricted version;
transmitting the change to the second additional shareable element from the stripped version of the MBSE model to the open version of the MBSE model; and
implementing the change to the second additional shareable element in the open version of the MBSE model.

5. The method of claim 1, wherein the change made to the shareable element in the open version of the MBSE model is received at a first device from the first user at the client device.

6. The method of claim 1, further comprising:
transmitting a change to a third additional shareable element of the open version of the MBSE model to the updated restricted version of the MBSE model; and
changing the third additional shareable element in the updated restricted version of the MBSE model.

7. The method of claim 1, comprising automatically, without user intervention, determining which engineering elements of the restricted version of the MBSE model are shareable and which are unshareable by analyzing the metadata associated with the engineering elements prior to sending the open version of the MBSE model outside of the organization.

8. The method of claim 1, further comprising:
receiving, from the second user, a change to a second shareable element in the updated restricted version of the MBSE model; and
prior to transmitting the change made to the second shareable element from the updated restricted version to a second open version of the MBSE model, requesting authorization to transmit the change made to the second shareable element.

9. The method of claim 1, further comprising:
analyzing the metadata associated with the plurality of engineering elements to identify untagged elements;
analyzing property descriptions of the untagged elements to determine which are shareable; and
updating the metadata to tag at least one of the untagged elements to indicate the at least one untagged element is shareable.

10. The method of claim 1, further comprising:
analyzing the metadata associated with the plurality of engineering elements to identify incorrectly tagged elements;
analyzing property descriptions of the incorrectly tagged elements to determine which are shareable; and updating metadata tags to indicate at least one of the incorrectly tagged elements is shareable.

11. The method of claim 1, further comprising:
determining an intended external organization for the open version of the MBSE model; and
selecting one or more of the shareable elements of the updated restricted version of the MBSE model for the open version of the MBSE model based, at least in part, on the intended external organization.

12. The method of claim 1, wherein the open version of the MBSE model comprises one or more snapshots of one or more of the shareable elements of the restricted version of the MBSE model determined from the accessed metadata.

13. A system for information management in model-based systems engineering (MBSE) modeling, the system comprising:
a computing system to form a collaborative environment in communication via a network with a client device associated with a first user, the computing system having one or more processors and memory, the memory storing a restricted version of an MBSE model, the MBSE model comprising a plurality of engineering elements and metadata associated with the plurality of engineering elements, wherein the plurality of engineering elements relate to production of a product or service;
wherein the one or more processors are programmed to:
access the metadata associated with the plurality of engineering elements of MBSE model, wherein the metadata comprises tags for the plurality of engineering elements, wherein the plurality of engineering elements comprises shareable elements and unshareable elements, wherein tags assigned to shareable elements indicate respective engineering elements that are shareable outside of an organization, and wherein tags assigned to unshareable elements indicate respective engineering elements that are subject to export controls or include proprietary information not to be shared outside of the organization;
determine, from the accessed metadata, which of the plurality of engineering elements are shareable elements and which are unshareable elements by analyzing the tags associated with the plurality of engineering elements;
generate an open version of the MBSE model from the restricted version of the MBSE model by stripping each unshareable element out of the restricted version of the MBSE model such that the open version of the MBSE model is void of the unshareable elements;
send, via the network, the open version of the MBSE model to the first user outside of the organization, the first user not having authorization to access the restricted version;
receive, via the network, an updated open version of the MBSE model based on an update to the open version of the MBSE model from the first user, the update including a change made to a shareable element in the open version of the MBSE model, the change including an element comprising a tag that stops the tagged element from being shared in the open version of the MBSE model and the restricted version of the MBSE model;
generate, from the updated open version of the MBSE model, an updated restricted version of the MBSE model, the updated restricted version of the MBSE model comprising each of the unshareable elements, each of the shareable elements, and the change made to the shareable element by the first user without the tagged element; and display the updated restricted version of the MBSE model to a second user inside of the organization, the second user having authorization to access the restricted version and the updated restricted version of the MBSE model.

14. The system of claim 13, wherein the one or more processors are further programmed to:

receive an instruction from a user to migrate a change to an additional shareable element made in the restricted version of the MBSE model to the open version of the MBSE model; and incident to the instruction from the user to migrate the change, transmit a snapshot of the one or more of the shareable elements with the change to the additional shareable element.

15. One or more non-transitory computer memory embodied with computer-executable instructions for information management in MBSE modeling, the one or more computer memory comprising:

a tag analyzer configured for accessing metadata associated with a plurality of engineering elements in a restricted version of an MBSE model, wherein the plurality of engineering elements relate to production of a product or service, wherein the metadata comprises tags for the plurality of engineering elements, wherein the plurality of engineering elements comprises shareable elements and unshareable elements, wherein tags assigned to shareable elements indicate respective engineering elements that are shareable outside of an organization, wherein tags assigned to unshareable elements indicate respective engineering elements that are subject to export controls or include proprietary information not to be shared outside of the organization, and wherein the tag analyzer is further configured to determine from the accessed metadata which of the plurality of engineering elements are shareable elements and which are unshareable elements in the restricted version of the MBSE model by analyzing the tags associated with the plurality of engineering elements;

a multi-version generator configured for creating a stripped version of the restricted version of the MBSE model, the stripped version of the restricted version of the MBSE model comprising only the shareable elements of the MBSE model determined through analyzing the accessed metadata;

a clone generator configured for generating an open version of the MB SE model from the stripped version of the restricted version of the MB SE model, the open version of the MB SE model including one or more of the shareable elements and being void of the unshareable elements of the restricted version of the MBSE model; and an MBSE application that, when executed by one or more processors in a computing system that forms a collaborative environment in communication via a network with a client device associated with a first user, cause the one or more processors to perform the following operations:

sending, via the network, the open version of the MB SE model to the first user outside of the organization, the first user not having authorization to access the restricted version of the MBSE model;

receiving, via the network, an updated open version of the MBSE model based on an update to the open version of the MBSE model from the first user, the update including a change made to a shareable element in the open version of the MBSE model, the change including an element comprising a tag that stops the tagged element from being shared in the open version of the MBSE model and the restricted version of the MBSE model;

generating, from the updated open version of the MBSE model, an updated restricted version of the MBSE model, the updated restricted version of the MBSE model comprising each of the unshareable elements, each of the shareable elements, and the change made to the shareable element by the first user without the tagged element; and displaying the updated restricted version of the MBSE model to a second user inside of the organization, the second user having authorization to access the restricted version and the updated restricted version.

16. The one or more computer memory of claim 15, further comprising a change manager further configured for:

receiving, at the restricted version, a second change to a second shareable element;

requesting user authorization to make the second change to the second shareable element in the open version;

receiving the user authorization; and transmitting the second change of the second shareable element for implementation in the open version.

17. The system of claim 13, wherein the one or more processors are further programmed to:

analyze the metadata associated with the plurality of engineering elements to identify untagged elements;

analyze property descriptions of the untagged elements to determine which are shareable; and update the metadata to tag at least one of the untagged elements to indicate the at least one untagged element is shareable.

18. The system of claim 13, wherein the one or more processors are further programmed to:

analyze the metadata associated with the plurality of engineering elements to identify incorrectly tagged elements;

analyze property descriptions of the incorrectly tagged elements to determine which are shareable; and update metadata tags to indicate at least one of the incorrectly tagged elements is shareable.

19. The one or more computer memory of claim 15, wherein the tag analyzer is further configured to:

analyze the metadata associated with the plurality of engineering elements to identify untagged elements;

analyze property descriptions of the untagged elements to determine which are shareable; and update the metadata to tag at least one of the untagged elements to indicate the at least one untagged element is shareable.

20. The one or more computer memory of claim 15, wherein the tag analyzer is further configured to:

analyze the metadata associated with the plurality of engineering elements to identify incorrectly tagged elements;

analyze property descriptions of the incorrectly tagged elements to determine which are shareable; and update metadata tags to indicate at least one of the incorrectly tagged elements is shareable.

* * * * *

UNITED STATES PATENT AND TRADEMARK OFFICE
CERTIFICATE OF CORRECTION

PATENT NO. : 11,928,400 B2
APPLICATION NO. : 16/874494
DATED : March 12, 2024
INVENTOR(S) : Ivan Ognev and Karen Maria Herrera Teague Page 1 of 1

It is certified that error appears in the above-identified patent and that said Letters Patent is hereby corrected as shown below:

In the Claims

At Column 19, Line 1, Claim 1, "the MB SE" should be --the MBSE--;
At Column 19, Line 9, Claim 2, "the MB SE model;" should be --the MBSE model;--;
At Column 19, Line 19, Claim 4, "the MB SE model," should be --the MBSE model,--;
At Column 19, Line 29, Claim 5, "the MB SE model" should be --the MBSE model--;
At Column 19, Line 37, Claim 6, "the MB SE model" should be --the MBSE model--;
At Column 20, Line 29, Claim 13, "MB SE model," should be --MBSE model,--;
At Column 20, Line 65, Claim 13, "the MB SE" should be --the MBSE--;
At Column 21, Line 52, Claim 14, "the MB SE model" should be --the MBSE model--;
At Column 21, Line 53, Claim 14, "the MB SE model," should be --the MBSE model,--;
At Column 21, Line 54, Claim 14, "the MB SE model" should be --the MBSE model--;
At Column 21, Lines 64-65, Claim 14, "the MB SE model" should be --the MBSE model--.

Signed and Sealed this
Ninth Day of April, 2024

Katherine Kelly Vidal
*Director of the United States Patent and Trademark Office*